(12) United States Patent
Ravishankar et al.

(10) Patent No.: US 11,630,653 B2
(45) Date of Patent: Apr. 18, 2023

(54) EXECUTION OF COMPUTATION GRAPHS

(71) Applicant: NVIDIA CORPORATION, Santa Clara, CA (US)

(72) Inventors: Mahesh Ravishankar, Kirkland, WA (US); Vinod Grover, Mercer Island, WA (US); Evghenii Gaburov, Santa Clara, CA (US); Alberto Magni, Berlin, WA (US); Sean Lee, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 155 days.

(21) Appl. No.: 15/872,663

(22) Filed: Jan. 16, 2018

(65) Prior Publication Data

US 2018/0203673 A1 Jul. 19, 2018

Related U.S. Application Data

(60) Provisional application No. 62/446,302, filed on Jan. 13, 2017.

(51) Int. Cl.
*G06F 8/41* (2018.01)
*G06F 9/455* (2018.01)
*G06N 20/00* (2019.01)

(52) U.S. Cl.
CPC ............ *G06F 8/443* (2013.01); *G06F 9/4552* (2013.01); *G06N 20/00* (2019.01)

(58) Field of Classification Search
CPC ...... G06F 8/36; G06F 9/4494; G06F 16/9024; G06F 8/34; G06F 8/41–49; G06F 9/4552; G06F 9/50–5005; G06F 9/5027–5077; G06F 8/40; G06F 8/51; G06N 20/00; G06N 5/022; G06T 1/20
USPC ........................................................ 717/106
See application file for complete search history.

(56) References Cited

U.S. PATENT DOCUMENTS

| | | | |
|---|---|---|---|
| 6,430,590 B1 * | 8/2002 | Fischer | G06F 30/23 718/100 |
| 7,689,582 B2 | 3/2010 | Behnen et al. | |
| 8,250,548 B2 | 8/2012 | Kasahara et al. | |
| 9,424,079 B2 | 8/2016 | Rossbach et al. | |
| 9,501,269 B2 * | 11/2016 | Rodgers | G06F 8/447 |
| 9,798,527 B1 * | 10/2017 | Bendersky | G06F 16/9024 |

(Continued)

OTHER PUBLICATIONS

Anonymous, "Theano 0.7 documentation>>Extending Theano>>Graph Structures", deeplearning.net [online], 2016 [retrived May 4, 2020], Retrieved from Internet: <URL:https://web.archive.org/web/20160315225837/http://deeplearning.net/software/theano/extending/graphstructures.html>, pp. 1-8.*

(Continued)

*Primary Examiner* — Todd Aguilera
(74) *Attorney, Agent, or Firm* — Davis Wright Tremaine LLP

(57) ABSTRACT

A computation graph is accessed. In the computation graph, operations to be performed are represented as interior nodes, inputs to the operations are represented as leaf nodes, and a result of the operations is represented as a root. Selected sets of the operations are combined to form respective kernels of operations. Code is generated execute the kernels of operations. The code is executed to determine the result.

22 Claims, 6 Drawing Sheets

(56) References Cited

U.S. PATENT DOCUMENTS

| | | | |
|---|---|---|---|
| 2007/0179923 A1* | 8/2007 | Stanfill | G06F 9/4494 706/50 |
| 2007/0294663 A1* | 12/2007 | McGuire | G06F 8/45 717/108 |
| 2009/0327669 A1* | 12/2009 | Imada | G06F 8/433 712/226 |
| 2010/0241828 A1* | 9/2010 | Yu | G06F 8/456 712/30 |
| 2011/0066999 A1* | 3/2011 | Rabinovich | G06F 8/51 717/104 |
| 2012/0266182 A1 | 10/2012 | Brazier | |
| 2013/0232495 A1 | 9/2013 | Rossbach et al. | |
| 2013/0346988 A1 | 12/2013 | Bruno et al. | |
| 2014/0055347 A1 | 2/2014 | Taylor et al. | |
| 2014/0282586 A1* | 9/2014 | Shear | G06F 9/5072 718/104 |
| 2015/0363294 A1* | 12/2015 | Carback, III | G06F 8/37 717/132 |
| 2016/0055331 A1* | 2/2016 | Szczeszynski | G06F 21/64 726/22 |
| 2016/0092181 A1* | 3/2016 | Rodgers | G06F 8/447 717/145 |
| 2016/0196082 A1* | 7/2016 | Bhardwaj | G06F 3/0619 711/162 |
| 2017/0161038 A1* | 6/2017 | Ottoni | G06F 16/9024 |
| 2018/0129686 A1* | 5/2018 | Vaishnav | G06F 16/215 |
| 2018/0173848 A1* | 6/2018 | Foryciarz | G06F 19/28 |
| 2018/0196669 A1* | 7/2018 | Gschwind | G06F 8/41 |
| 2019/0004839 A1* | 1/2019 | Cheng | G06F 9/45558 |

OTHER PUBLICATIONS

M. Ravishankar, V. Grover. Accelerating Computation Graphs on Multi-Core CPUs and GPUs, 2017.

* cited by examiner

EXECUTION OF COMPUTATION GRAPHS

RELATED APPLICATION

This application claims priority to U.S. Provisional Application No. 62/446,302, entitled "Accelerating Computation Graphs on Multi-Core CPUs and GPUs," filed on Jan. 13, 2017, which is hereby incorporated by reference in its entirety.

STATEMENT REGARDING FEDERALLY SPONSORED RESEARCH OR DEVELOPMENT

This invention was made with government support under LLNS subcontract B609487 (FastForward2 Node) awarded by the U.S. Department of Energy (U.S. D.O.E). The government has certain rights in the invention.

BACKGROUND

Modern machine learning frameworks such as TensorFlow, CAFFE (Convolutional Architecture for Fast Feature Embedding), Torch, and Theano explicitly provide a programming model based on computation graphs for expressing training and inference problems. Computation graphs also arise when compiling dynamic language frameworks like NumPy and similar collection oriented programming models. (TensorFlow is an open source software library for numerical computation using data flow graphs. CAFFE is a deep learning framework. Torch is a scientific computing framework with support for machine learning algorithms. Theano is a numerical computation library for Python. Python is an interpreted high-level programming language for general-purpose programming. NumPy is a library for the Python programming language, including support for large, multi-dimensional arrays and matrices, along with a collection of high-level mathematical functions to operate on those arrays.)

The computation graphs are typically directed acyclic graphs (DAGs), where nodes represent data as multi-dimensional matrices or tensors. The leaf nodes represent input data, and interior nodes represent operations that operate on tensors.

Each of the operations in a DAG (each node in the DAG) is executed eagerly. However, this results in less efficient execution because such an approach cannot perform optimizations across operations.

Also, without support from the programming infrastructure, applications cannot be "ported" to multiple, different instruction sets and processing architectures (e.g., graphics processing units, GPUs, versus central processing units, CPUs) without reimplementation of all operations for that instruction set or architecture. Some machine learning frameworks need changes to the applications themselves in order to target GPUs. As a result, developers only port their applications to GPUs if the performance benefit outweighs the amount of effort needed to do so.

However, machine learning applications are one of the largest domains of applications where GPUs can be used. Thus, there is a need to be able to generate efficient code for GPUs that makes it easier to port applications such as machine learning applications to GPUs.

SUMMARY

Embodiments according to the invention provide a methodology that can accelerate execution of a computation graph, specifically a directed acyclic graph (DAG). The computation graph can be made more efficient by combining operations across different stages of the graph and then generating code to execute those operations. The code can be specialized to target different target architectures: graphics processing units (GPUs) and central processing units (CPUs). For dynamic library frameworks, the methodology can be used without significant changes to clients of such libraries.

In embodiments according to the present invention, a computation graph is accessed. The computation graph includes nodes representing operations to be performed, inputs to the operations, and results of the operations. More specifically, in an embodiment, operations to be performed are represented as interior nodes, inputs to the operations are represented as leaf nodes, and a result of the operations is represented as a root. Selected sets of the operations (selected nodes) are combined (fused) to form respective kernels of operations. The kernels of operations are encoded as an executable function. The code (function) is executed to determine the result.

In an embodiment, each node of the computation graph is represented as a data structure. Each data structure includes a first field that identifies the type of the node, a second field that lists inputs to the node represented by the data structure, and a third field that includes a value for the node. The value may be a result of an operation if the node represents an operation to be performed (e.g., an interior node) and the result has been computed (materialized), a null value if the node represents an operation to be performed (e.g., an interior node) and a result of the operation has not yet been computed (not yet materialized), and an input value if the node represents an input to an operation (e.g., a leaf node; leaf nodes are materialized). Nodes of the computation graph are traversed to identify sequences of the data structures that have not been materialized versus data structures that have been materialized. The sequences of data structures are combined (fused) to form the kernels of operations. The kernels of operations are encoded as an executable function. The function can be executed on different GPU and CPU architectures.

In summary, embodiments according to the present invention accelerate execution of operations across stages of a computation graph. The computation graph can be used to generate efficient code. The computations can be executed on different target architectures while also improving performance. For dynamic library frameworks, the disclosed methodology can be used with little or no changes to clients of the libraries, allowing for fusion across multiple library calls.

These and other objects and advantages of the various embodiments of the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Figure 1:
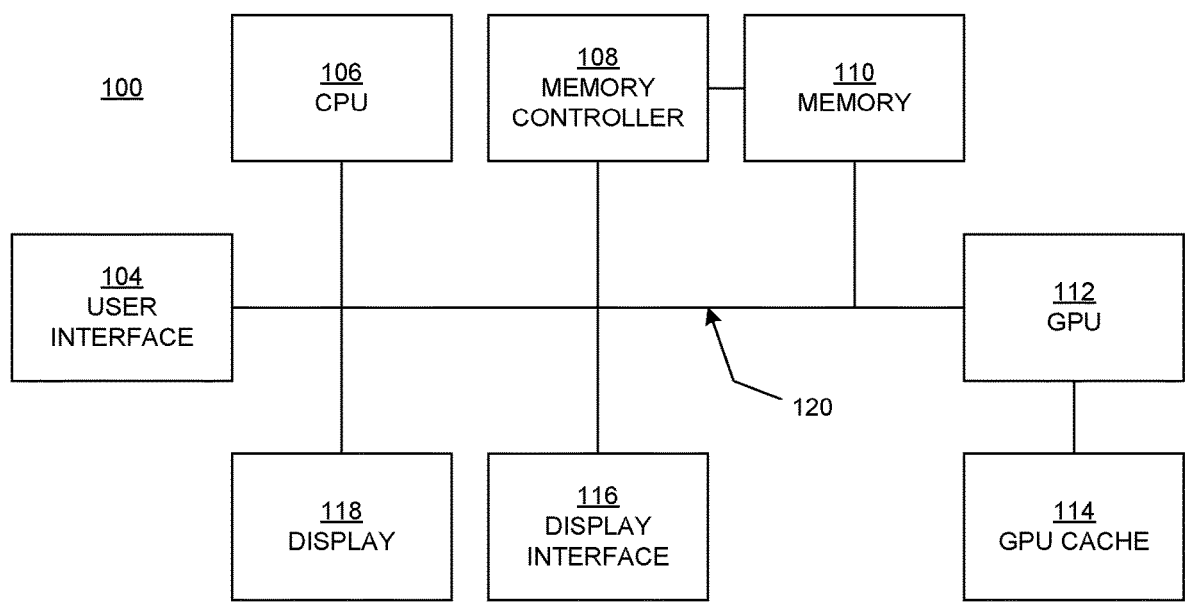
FIG. 1 is a block diagram illustrating an example computer system upon which embodiments according to the present invention can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "sending," "executing," "accessing," "combining," "generating," "representing," "traversing," "encoding," "compiling," "generating," "calling," "storing," "buffering," "registering," "using," or the like, refer to actions and processes (e.g., the flowchart 600 of FIG. 6) of a computer system or similar electronic computing device or processor (e.g., the computer system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram illustrating an example of a computer system 100 upon which embodiments according to the present invention can be implemented. In the example of FIG. 1, the computer system 100 includes a user interface 104, a central processing unit (CPU) 106, a memory controller 108, a memory 110, a graphics processing unit (GPU) 112, a GPU cache 114, a display interface 116, and a display 118, each of which can communicate with the other components using bus 120. A computer system on which embodiments according to the present invention can be implemented may include other components in addition to those just listed, or it may not include all of the listed components.

The memory 110 is accessible to both the CPU 106 and the GPU 112. The CPU 106 and the GPU 112 include registers that can be used to store results of computations performed by the CPU and GPU.

In an embodiment, the GPU 112 has a highly-parallel structure. For example, the GPU 112 may include multiple processing elements (e.g., pipelines) that are configured to operate in a parallel manner. Each pipeline can include more than one processing units or stages.

The CPU 106 can be a multi-core CPU that executes one or more software applications in parallel. The software applications that execute on the CPU 106 may include one or more graphics rendering instructions that instruct the GPU 112 to execute and provide graphics data to the display 118.

In overview, in embodiments according to the present invention, a computation graph (e.g., a directed acyclic graph, DAG) is accessed, selected sets of operations are combined to form operation kernels, and code is generated to execute the operation kernels.

Figure 2:
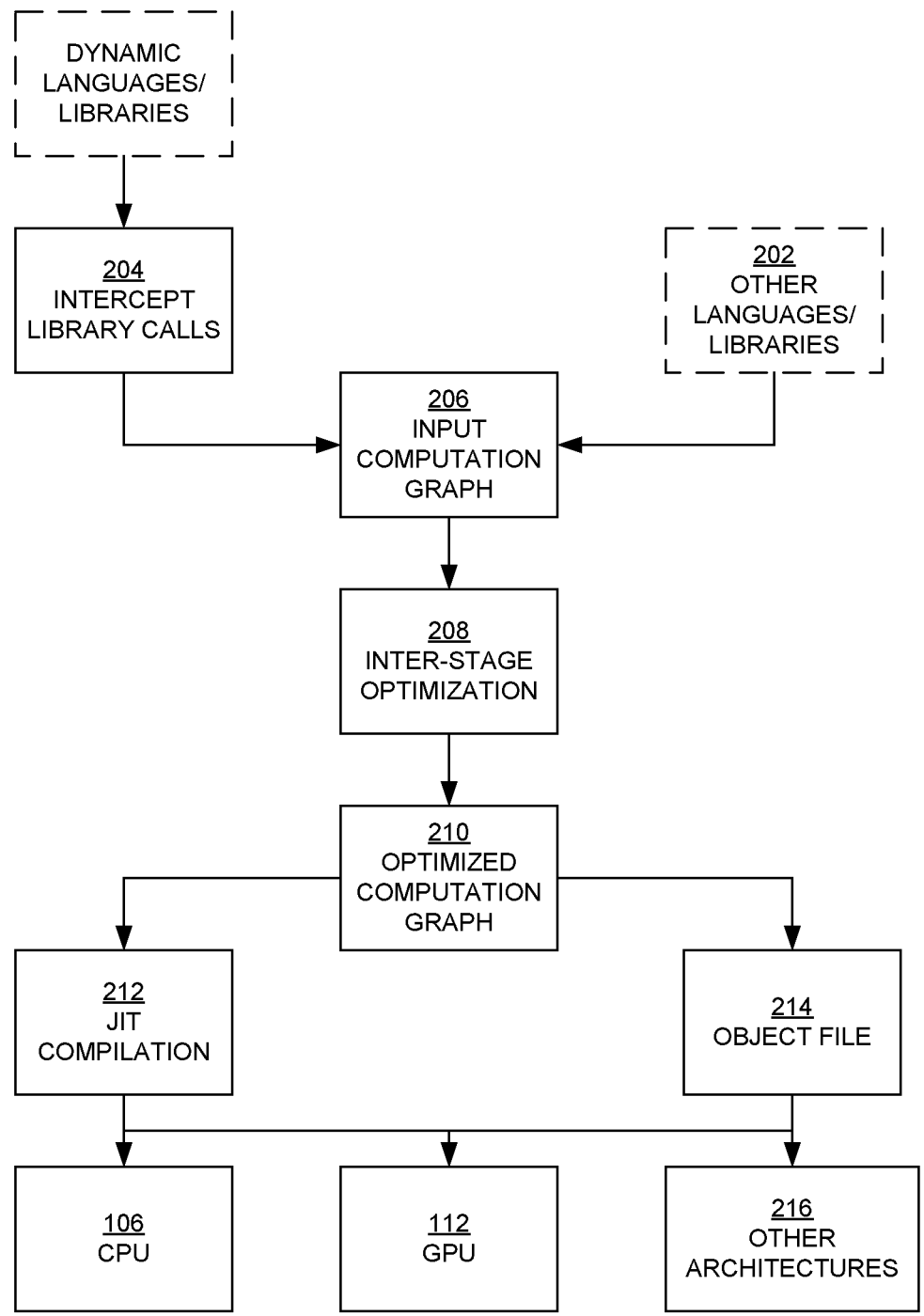
FIG. 2 illustrates a methodology for accelerating execution of a computation graph in embodiments according to the present invention.

FIG. 2 illustrates a methodology for accelerating execution of a computation graph (e.g., a computation DAG) in embodiments according to the present invention. The computation graph 206 may be provided as an input from frameworks like TensorFlow (block 202).

Alternatively, for dynamic language frameworks like NumPy and Sparc (Scalable Processor Architecture) that make library calls to implement operations, the computation graph 206 is built by intercepting those library calls (block 204). For example, consider the Python program shown in Table 1, which uses the NumPy library.

TABLE 1

Example Program

```
import numpy as np ;
x = np . array ([1 , 2, 3]);
y = np . array ([4 , 5, 6]);
z = x + y;
result = z * 2;
print ( result );
```

Operations involving NumPy, such as "np.array" and "print," as well as operations on these objects, like "+" and "*," result in calls to the NumPy library that implements the respective functionality. Furthermore, each of these calls results in a separate instance of a NumPy object; for example, each of "x," "y," "z," and "result" are different objects. Each of these objects contains a buffer that stores the values of the array as well as other information needed for subsequent use of the object, such as the shape and size of the array. The only visible effect of the program is to output (e.g., print) the value of the variable "result." All other statements have no side effects, and values of the intermediate object "z" need not be explicitly stored in memory.

Figure 3:
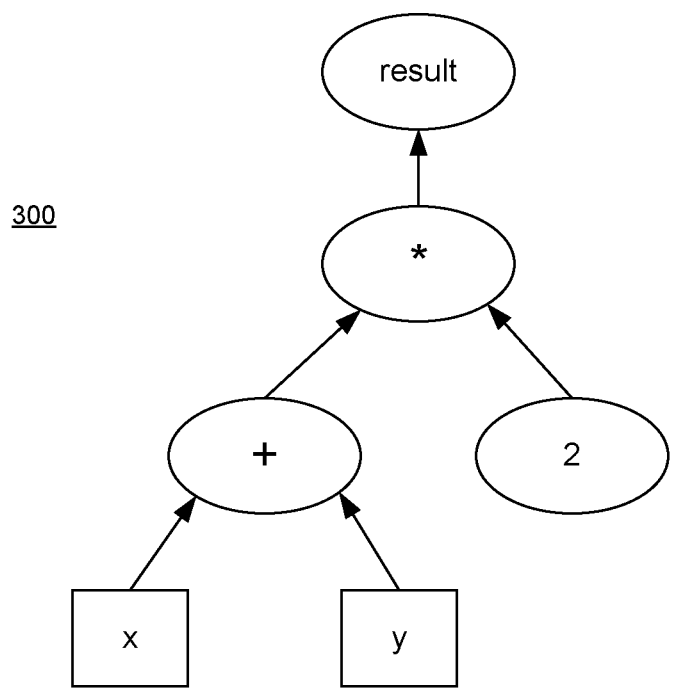
FIGS. 3, 4, and 5 are examples of computation graphs of program listings in embodiments according to the present invention.

FIG. 3 is a computation graph 300 of the example program listing shown in Table 1, in embodiments according to the present invention. The computation graph 300 can be used to recognize instances where inter-stage optimizations can be performed (block 208 of FIG. 2), such as but not limited to fusion (fusion is a transformation that combines, or fuses, multiple operations into a kernel of operations that can be executed together in a single kernel launch) and common sub-expression elimination. In turn, as a result of those optimizations, an optimized computation graph 210 and efficient code (a function) for execution of the computation graph are generated.

The computation graph 300 can also be used to recognize instances in which results can be stored in faster memory such as registers in the CPU 106 or GPU 112 instead of in memory 110 (FIG. 1). Such optimizations can result in elimination of intermediate results (like "z") whose values need not be explicitly stored in memory.

The optimized graph 210 of FIG. 2 can be compiled just-in-time (JIT) and executed on the multi-core CPU 106 or on the GPU 112 (block 212) or another architecture 216. Alternatively, an object file can be generated and linked into a user application (block 214) executed by the multi-core CPU 106 or the GPU 112 or another architecture 216. In the latter case, the user application can invoke the computation represented by the optimized computation graph 210 by calling into a function within the object file that also contains code to marshal the resources necessary for the execution of the computation graph.

Figure 4:
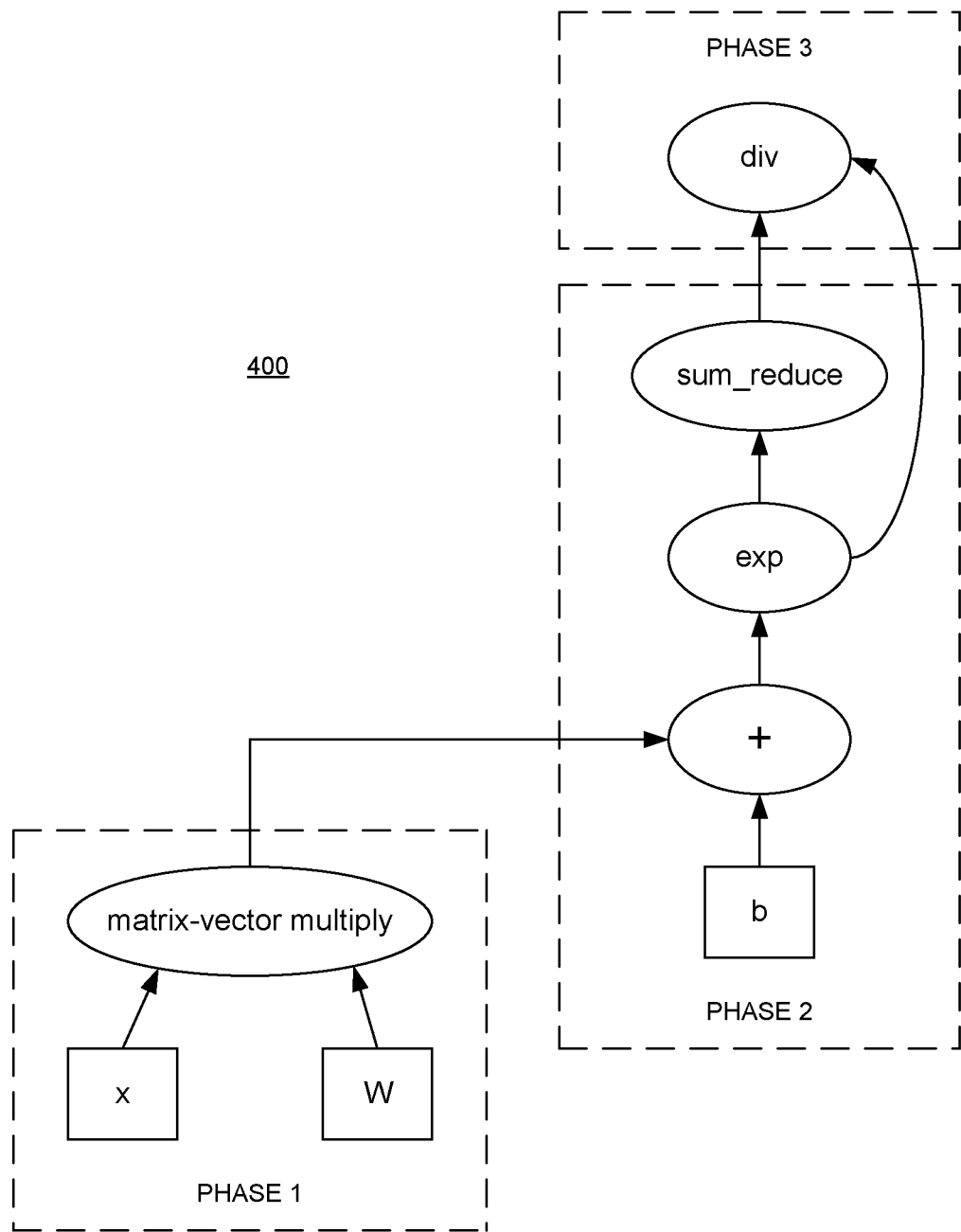

The methodology just described is illustrated with reference to Table 2 and FIG. 4. FIG. 4 illustrates an optimized computation graph 400 for the example program listed in Table 2, in embodiments according to the present invention. Table 2 is a NumPy implementation of an example computation from the machine learning domain.

TABLE 2

Example Program

| 1 | import numpy as gnp; |
| 2 | W = gnp.random.random((10, 784)); |
| 3 | b = gnp.random.randn(1O); |
| 4 | x = gnp.random.randn(784); |
| 5 | y__num = gnp.exp(gnp.dot(W, x) + b); |
| 6 | y__denom = gnp.sum(y__num); |
| 7 | y = y__num / y__denom; |
| 8 | print(y); |

In Table 2, lines 2-4 are inputs to the operations (computations) in lines 5-7.

With reference back to FIG. 2, the example program of Table 2 is represented by a computation graph 206 that, in an embodiment, is built by intercepting library calls that implement operations. That computation graph can be analyzed to recognize instances where inter-stage optimizations can be performed (block 208 of FIG. 2), such as but not limited to fusion. In the Table 2 example, this analysis results in generation of the optimized computation graph 400 of FIG. 4, which corresponds to the optimized computation graph 210 of FIG. 2. In this example, the computation graph 400 can be efficiently executed in three phases as shown.

In phase 1 of FIG. 4, a matrix vector product ("gnp.dot(W, x)" in line 5 of Table 2) is computed. The matrix vector product could use, for example, MKL (Math Kernel Library) or CuBLAS (CUDA® Basic Linear Algebra Subprograms).

In phase 2, fused execution of the computation that represents the activation function is applied to the result of phase 1 ("gnp.exp" and "+" in line 5 of Table 2), followed by a reduction ("gnp.sum" in line 6 of Table 2) to compute the normalization factor. This can be executed as a map-reduce computation. Note that this phase has two outputs: the value of the exponentiation ("exp" in FIG. 4), and the result of reducing this array ("sum_reduce" in FIG. 4) to get the normalization factor.

In phase 3, the exponentiation from phase 2 is divided by ("div" in FIG. 4) the computed normalization (line 7 of Table 2).

In conventional approaches, each node in the computation graph would be computed as a separate kernel of operation. In contrast, in embodiments according to the invention, several computations can be fused (combined) using the input computation graph representation (a computation graph corresponding to the computation graph 206 of FIG. 2) to generate the optimized computation graph 400 (a computation graph corresponding to the computation graph 210 of FIG. 2).

More specifically, each operation is performed separately in conventional approaches. For example, the operations in line 5 of Table 2 are conventionally performed as follows: "gnp.dot" is executed and the result is stored, then "b" is added to that first result and a new (second) result is stored, then "gnp.exp" is executed using the second result and another new result is stored. This type of conventional approach continues through the operations in lines 6 and 7 of Table 2. Conventionally, each of the operations requires a separate kernel launch, and the result of each operation is stored in computer system memory.

In contrast, in embodiments according to the present invention, the operations in phases 1, 2, and 3 represent respective kernels of operations. That is, the operations in phase 1 are a first kernel of operations, the operations in phase 2 are a second kernel of operations, and the operations in phase 3 are a third kernel of operations. The operations in each kernel are executed together. Thus, in embodiments according to the present invention, more operations are performed per kernel launch relative to conventional approaches. Accordingly, fewer kernel launches are needed, thereby reducing overhead relative to conventional approaches.

Also, note that, for example, the operations in phase 2 include operations from lines 5 and 6 of Table 2. In general, in embodiments according to the present invention, as long as constraints between the operations are preserved so that the required inputs are available, operations can be reordered as part of the optimization.

As mentioned above, the computation graph 400 can also be used to recognize instances in which results can be stored in registers of a processor (e.g., a CPU or GPU) instead of being stored in computer system memory. For example, the product of the "matrix-vector multiply" operation is stored in a register and the value of "b" is separately stored in a register only until they are used for the "+" operation, the result of the "+" operation is stored in a register only until it is needed by the "exp" operation, and so on. Such optimizations can result in elimination of intermediate results whose values need not be explicitly stored in computer system memory, thus also reducing overhead relative to conventional approaches.

A problem that may be encountered with fusion is to determine at what point the fusion should be stopped. Aggressive fusion might result in executions that require more resources than what the hardware can provide. Furthermore, certain computations like BLAS kernels might be better executed without fusion by calling into pre-compiled libraries like MKL or the CuBLAS library. In embodiments according to the present invention, such issues are alleviated by identifying points at which to stop fusion.

Also, the size of a computation graph, if left unchecked, may become very large, resulting in high compilation times. This can negate any improvement that is obtained from optimizing across nodes of the computation graph. To counter this, once the size of the computation graph reaches some predefined threshold, portions of the computation graph can be computed. The result from a computed portion of the computation graph can be used as an input to another portion of the computation graph. Partitioning the computation graph in this manner can keep the compilation time in check for larger computations. Partitioning the computation can be especially important for JIT-compiling.

In embodiments according to the present invention, each node of a computation graph is associated with a data structure referred to herein as a "NodeObject." In an embodiment, the fields of a NodeObject are the fields shown in Table 3.

TABLE 3

Example Data Structure

NodeObject {
   OpType;
   List < NodeObject >;
   MaterializedObject;
};

In the Table 3 example, the NodeObject includes a first field "OpType," a second field "List," and a third field "MaterializedObject." The OpType field identifies the type of the operation for the node associated with the data structure. The List field identifies inputs to that operation. Specifically, the List field lists other NodeObjects needed to compute the value of the NodeObject. The MaterializedObject field includes the result of the operation if the operation has been executed. By default, the MaterializedObject field is initially empty (null) for all nodes except for the leaf nodes of the computation graph. The leaf nodes have values that are inputs to the computation represented by the computation graph.

For example, with reference to FIG. 4, the data structure for the "matrix-vector multiply" node would be NodeObject {matrix-vector multiply; List <x, y>; null;}. For example, the data structure for the "b" node would be NodeObject {b; List < >; b_value;}, where "b_value" is the value of "b."

The root node of a computation graph represents the result of the computation graph. The process of computing the result is referred to as materialization of the root node. To materialize the root node, the computation graph is traversed backwards, from the root node to the leaf nodes. In the example of FIG. 3, "result" is the root node of the computation graph 300, and "x" and "y" are inputs (leaf nodes).

A computation graph can be used to represent operations that use/update only a portion of an array. For example, Table 4 shows a code snippet from a neural network application that uses a portion of one NumPy array and updates a portion of another NumPy array.

TABLE 4

Figure 5:
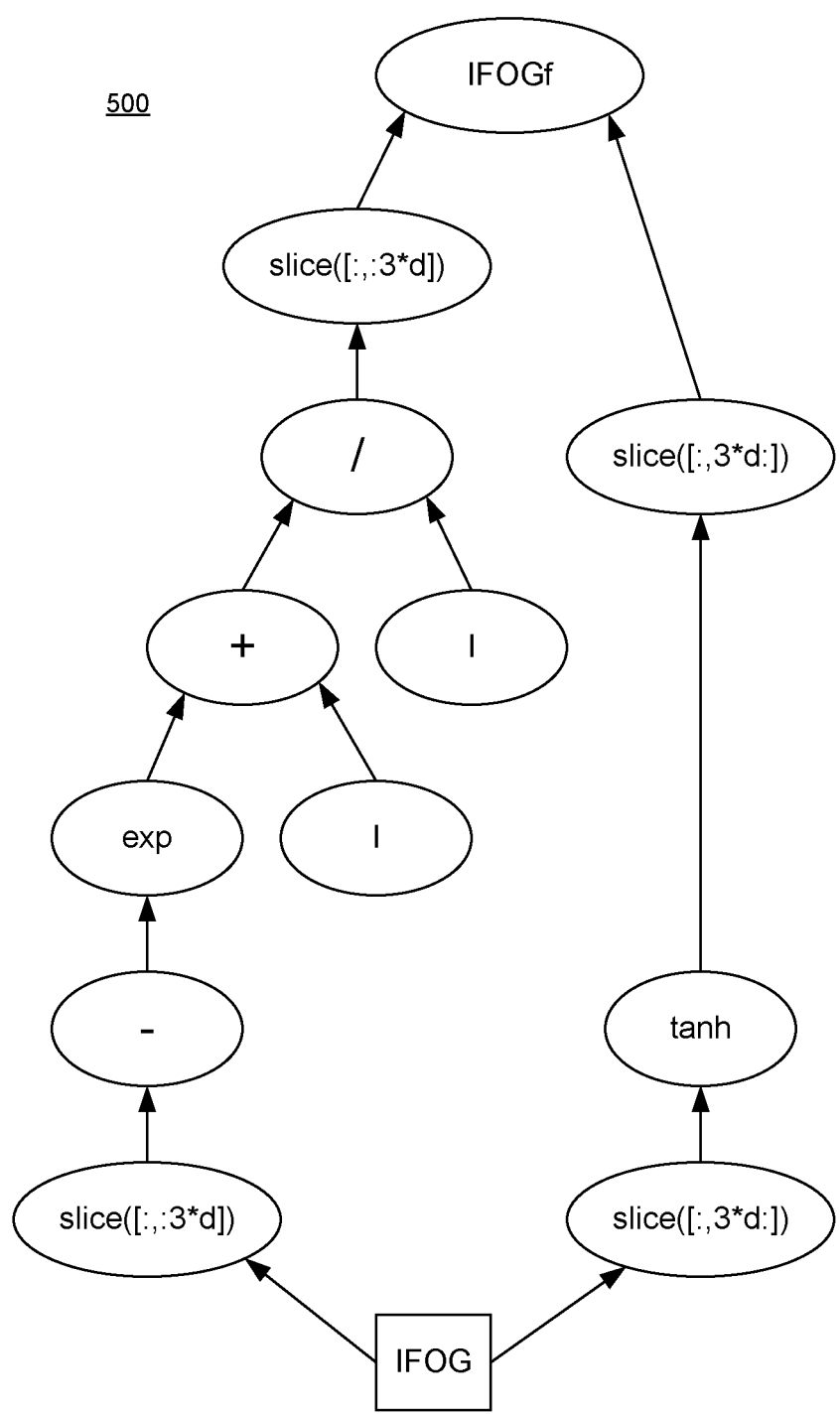

Example Program import numpy as np;
IFOGf [: ,:3* d] =
   1.0 / (1.0 + (np.exp (− IFOG [: ,:3*d ])));
IFOGf [: ,3*d] = np.tanh ( IFOG [: ,3*d :]);

The entire computation of Table 4 is represented by the computation graph 500 in FIG. 5. The node "IFOGf" is the root of the computation graph 500, and "IFOG" is the input.

Figure 6:
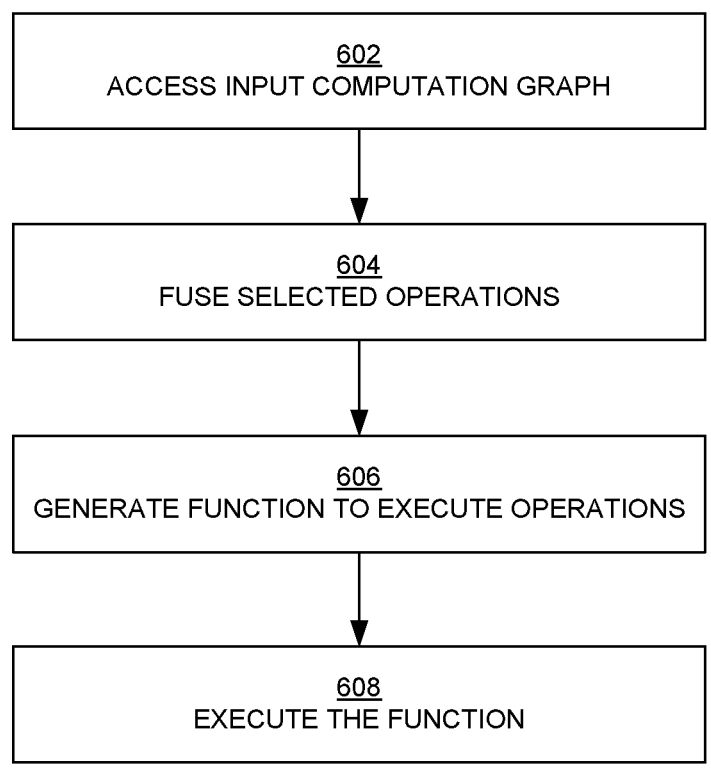
FIG. 6 is a flowchart of examples of operations in a method for accelerating execution of a computation graph in embodiments according to the present invention.

FIG. 6 is a flowchart 600 of examples of operations in a method for accelerating execution of a computation graph (e.g., a DAG) in embodiments according to the present invention. The operations can be performed in and by the computer system 100 of FIG. 1.

In embodiments according to the present invention, a single function that encodes the operations in the computation graph is generated by traversing the nodes of the computation graph from the root node to the leaf nodes. More specifically, the data structures corresponding to the nodes of the computation graph are traversed. In the process of generating the function, optimizations such as but not limited to common sub-expression elimination, instruction combining, and strength reduction can be applied. In effect, these optimizations are applied across multiple nodes of the computation graph, which cannot be achieved through conventional library-based approaches. Once the function is generated, it can be compiled and executed to materialize the root node.

Significantly, the function can be specialized to target any architecture: GPUs or multi-core CPUs.

For example, with reference to FIG. 4, the computation graph 400 is traversed backwards (that is, starting from the root node) to build up a sequence of objects (data structures). When an object ("first object") is reached that needs to be materialized because it is needed as an input for another object, the portion of the computation graph is traversed backwards starting from the first object, and other objects needed to materialize the first object are collected to identify objects that are to be executed together (a kernel of operations). In other words, the computation graph is traversed backwards until materialized objects are reached.

For example, in phase 2 of FIG. 4, "sum_reduce" needs to be materialized as an input to "div" in phase 3. Starting at the "sum_reduce" node, the computation graph 400 is traversed backwards to identify nodes that are not materialized, namely the "exp" and "+" nodes. The "b" node is already materialized because it is an input (a leaf node). However, "matrix-vector multiply" needs to be materialized as an input to the "+" node. Thus, the computation graph is traversed backward starting from the "matrix-vector multiply" node to identify objects needed to materialize "matrix-vector multiply," namely the "x" and "w" nodes, which are already materialized because they are inputs. In this manner, groups of objects (sequences of data structures) are identified and collected into kernels of operations that can be executed together in phase 2 and in phase 1, respectively.

In block 602 of FIG. 6, an input computation graph (e.g., the computation graph 206) is accessed.

In block 604 of FIG. 6, selected operations (nodes of the computation graph) are combined (fused) to form respective kernels of operations in an optimized computation graph (e.g., the optimized computation graph 210 of FIG. 2). In an embodiment, the selected operations (nodes) are identified by traversing the nodes of the computation graph to identify which nodes have been materialized. That is, the nodes that have a corresponding data structure that has a value other than the null value in their MaterializedObject (third) field are identified. Sequences of such data structures can be grouped into kernels of operations.

In block 606 of FIG. 6, code to execute the kernels of operations (e.g., the function discussed above) is generated. In embodiments, the kernels of operations are encoded as an executable function that includes the code to execute the kernels of operations.

In block 608, the code (function) is executed to determine the result (materialize the root node).

In an embodiment, execution includes JIT-compiling the function. In another embodiment, execution includes generating an object file including the function and that is linked into an application, and calling into the function in the object file to execute the code.

In an embodiment, execution includes storing, in a register, a result of an operation of a kernel of operations that is an input to another operation of the kernel of operations.

In an embodiment, execution includes executing a first portion of the computation graph and using the result as an input to a second portion of the computation graph if the computation graph exceeds a threshold size.

In summary, embodiments according to the present invention provide a framework that can operate on computation graphs (e.g., DAGs). By analyzing the producer-consumer (output-input) relationship between the different nodes of the computation graph, this framework can fuse computations across nodes and generate a single kernel for each set of fused computations. This also allows the use of optimization techniques like sub-expression elimination, deadcode elimination, and the like across nodes of the computation graph.

Each kernel can be JIT-compiled to target different architectures such as multi-core CPUs and GPUs while also improving performance. The disclosed framework can be applied to any language (library) that exposes such an abstraction and can be done without changes to existing applications written in (using) the language (library). For dynamic libraries, the disclosed methodology can be used with minimal change to clients of such libraries, allowing for fusion/optimization across multiple library calls.

As noted, embodiments according to the present invention accelerate execution of operations across nodes of a computation graph. The computation graph can be used to generate efficient code. The nodes can be used to map to precompiled kernels, to expose maximum parallelism, or to reduce compilation time for JIT-compiling.

Embodiments according to the present invention provide the following benefits: acceleration of computation graphs for frameworks like MKL, NumPy, and Sparc; heterogeneous compilation of the computation graph for CPUs and CPUs; accelerated dynamic compilation on multi-core CPUs; optimization and fusion across multiple computation graph operations, targeting hand-tuned libraries; and representation of dynamic execution of libraries, such as NumPy, as computation graphs at runtime.

A variety of applications have been evaluated to demonstrate the benefits of the disclosed framework by implementing a Python package to intercept calls to NumPy library and build a computation graph as described herein. All of those applications show a significant performance improvement, especially for large problem sizes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims

What is claimed is:
1. A processor comprising:
one or more circuits to cause two or more computational graph nodes to be combined based, at least in part, on whether one or more of the two or more computational graph nodes are in an executable format.

2. The processor of claim 1, wherein the one or more circuits comprise one or more of: a graphics processing unit and a multi-core central processing unit.

3. The processor of claim 1, wherein a node of the two or more computational graph nodes is represented as a data structure with a first field that identifies a type of the node, a second field that lists inputs to the node, and a third field that comprises one of: a result of an operation performed, a null value when the operation is pending, and an input value of the node representing an input to the operation.

4. The processor of claim 1, further comprising:
the one or more circuits to perform a traversal of the two or more computational graph nodes to identify data structures that have other than a null value indicating operations pending using at least one of the two or more computational graph nodes.

5. The processor of claim 1, further comprising:
the one or more circuits to execute a first portion of a computation graph and to use a result obtained therefrom as an input to a second portion of the computation graph.

6. The processor of claim 1, further comprising:
just-in-time compiling within the one or more circuits.

7. The processor of claim 1, further comprising:
the one or more circuits to compile kernels from the two or more nodes of the computational graph to provide an executable function.

8. The processor of claim 7, further comprising:
a first circuit of the one or more circuits to generate an object file comprising the executable function having a link into an application; and
a second circuit of the one or more circuits to call into the function in the object file to execute the executable function.

9. A system comprising:
at least one processor; and
memory coupled to the at least one processor, the memory storing a computation graph associated with one or more neural networks and storing instructions that when executed by the at least one processor, performs steps of:
combining two or more computational graph nodes into an executable function, based at least in part on whether one or more of the two or more computational graph nodes are in an executable format; and
processing the executable function.

10. The system of claim 9, wherein the at least one processor comprises one or more of: a graphics processing unit and a multi-core central processing unit.

11. The system of claim 9, wherein a node of the two or more computational graph nodes is represented as a data structure with a first field that identifies a type of the node, a second field that lists inputs to the node, and a third field that comprises one of: a result after an operation, a null value when the operation is pending, and an input value of the node representing an input to the operation.

12. The system of claim 9, further comprising:
the at least one processor to perform a traversal of the two or more nodes to identify data structures that have other than a null value indicating operations pending using at least one of the two or more computational graph nodes.

13. The system of claim 9, further comprising:
the at least one processor to execute a first portion of the computation graph and to use a result obtained therefrom as an input to a second portion of the computation graph.

14. The system of claim 9, further comprising:
just-in-time compiling within the at least one processor.

15. The system of claim 9, further comprising:
the at least one processor to compile kernels from the two or more computational graph nodes of the computational graph to provide the executable function.

16. A non-transitory computer-readable medium having computer-executable instructions for executing a computation graph associated with one or more neural networks on at least one processor to cause the at least one processor to:
combine two or more computational graph nodes into an executable function, based at least in part on whether one or more of the two or more computational graph nodes are in an executable format; and
process the executable function.

17. The non-transitory computer-readable medium of claim 16, wherein the computation graph is performed on one or more of: a graphics processing unit and a multi-core central processing unit.

18. The non-transitory computer-readable medium of claim 16, wherein a node of the two or more computational graph nodes is represented as a data structure with a first field that identifies a type of the node, a second field that lists inputs to the node, and a third field that comprises one of: a result for an operation, a null value when the operation is pending, and an input value of the node representing an input to the operation.

19. The non-transitory computer-readable medium of claim 16, wherein the computer-executable instructions are further configured to cause the at least one processor to:
perform a traversal of the two or more computational graph nodes to identify data structures that have other than a null value indicating operations pending using at least one of the two or more nodes.

20. The non-transitory computer-readable medium of claim 16, wherein the computer-executable instructions are further configured to cause the at least one processor to:
execute a first portion of the computation graph and to use a result obtained therefrom as an input to a second portion of the computation graph.

21. The non-transitory computer-readable medium of claim 16, wherein the computer-executable instructions are further configured to cause the at least one processor to:
compile the two or more nodes using just-in-time compiling.

22. The non-transitory computer-readable medium of claim 16, wherein the computer-executable instructions are further configured to cause the at least one processor to:
compile kernels from the two or more computational graph nodes of the computational graph to provide the executable function.

* * * * *